United States Patent [19]

Piegari

[11] Patent Number: 5,294,051

[45] Date of Patent: * Mar. 15, 1994

[54] VALVE CONTROLLER FOR HOT WATER HEATING SYSTEM

[75] Inventor: William A. Piegari, Westfield, N.J.

[73] Assignee: General Electronic Engineering, Inc., Rahway, N.J.

[ * ] Notice: The portion of the term of this patent subsequent to Jun. 30, 2009 has been disclaimed.

[21] Appl. No.: 904,873

[22] Filed: Jun. 25, 1992

Related U.S. Application Data

[63] Continuation-in-part of Ser. No. 691,828, Apr. 26, 1991, Pat. No. 5,125,572.

[51] Int. Cl.$^5$ .............................................. F24D 3/00
[52] U.S. Cl. ................... 237/8 R; 236/91 E
[58] Field of Search ................ 237/8 R; 236/91 E; 165/39, 40; 364/557

[56] References Cited

U.S. PATENT DOCUMENTS

5,125,572 6/1992 Piegari .............................. 237/8 R

Primary Examiner—Henry A. Bennet
Attorney, Agent, or Firm—Siegmar Silber

[57] ABSTRACT

A valve controller for a hot water heating system having a water heating device, a water circulating device, and heater device. The Controller operates a water control valve between an open and a closed position, the valve controller comprising, a flow timer for variably establishing flow periodicity between a minimum flow time and a maximum flow time, a base cycle timer for variably establishing base cycle periodicity between a minimum base time and a maximum flow time. The base timer variably establishes a base cycle periodicity between a minimum base time and a maximum base time. A selector responsive to heat requirements for select a flow time and base cycle time.

17 Claims, 5 Drawing Sheets

VALVE CONTROLLER FOR HOT WATER HEATING SYSTEM

This application is a continuation-in-part of a copending application entitled HOT WATER HEATING CONTROL SYSTEM, filed Apr. 26, 1991 and bearing Ser. No. 07/691,828, now issued as U.S. Pat. No. 5,125,572 and dated Jun. 30, 1992.

The within application and U.S. Pat. No. 5,125,572, issued Jun. 30, 1992; application Ser. No. 07/691,828, filed Apr. 26, 1991 are of common ownership and inventorship and the terminal portion of the term hereof is disclaimed so that the patent(s) issuing thereon are co-terminus with said previously issued patent.

BACKGROUND OF THE INVENTION

1. Field of the Invention

This invention relates to a system for controlling the heating of buildings, and more particularly to maintaining an economical, steady comfort level in the perimeter zone or that interior space adjacent the building's outer walls. Further, the system is especially adapted to hot water heating.

2. Background of the Prior Art

In the past, numerous systems have been suggested for controlling the heating of buildings. The most common system is the ordinary thermostatic control in which a bimetallic strip remote from the room heat source, (usually mounted on an interior wall near the center of the building) operates a switch at predetermined levels to turn the heat inlet ON and OFF.

It has been found, especially in commercial buildings, that ordinary thermostatic control is undesirable. As a consequence numerous features have been added to promote fuel efficiency and increase comfort, among which are compensation for solar radiation, night temperature setback and automatic morning warmup. The latter features have been particularly stressed because of new requirements arising from the BOCA Code.

Recently, the present inventor disclosed a unique system for electrical heating control which is the subject of U.S. Pat. No. 4,582,982, issued Apr. 15, 1986 and which is marketed as the PACE ® system by General Electronic Engineering, Inc., of Rahway, N.J., assignee of the aforesaid Pat.. While the system has gained acceptance, a long felt need for adaptation to hot water went unfulfilled as a control system meeting the special requirements of hot water heating and the PACE system was unavailable. As will be found by reading the description of the invention which follows, these needs are met by a new and novel system that is both highly responsive and economical.

In the course of preparation for the parent application a patentability search was performed having a field of search which included U.S. Classifications 236/1B and 364/557. The search uncovered the following patents:

| U.S. Pat. No. | Inventor | Date of Issue |
|---|---|---|
| From Class 364/557 | | |
| 4,661,914 | William Mulokey et al. | April 28, 1987 |
| 4,555,764 | Thomas Kuehn | Nov. 26, 1985 |
| 4,527,246 | Vijay Masson | July 2, 1985 |
| 4,483,152 | James M. Bitondo | Nov. 20, 1984 |
| 4,475,685 | Phillip B. Grimado et al. | Oct. 9, 1984 |
| 4,455,095 | Werner Bleiker | June 19, 1984 |
| 4,390,959 | Christian G. Cabou | June 28, 1983 |
| 4,332,013 | Darrell Chelcun, et al. | May 25, 1982 |

-continued

| U.S. Pat. No. | Inventor | Date of Issue |
|---|---|---|
| 4,136,392 | Bruce D. Westphal et al. | Jan. 23, 1979 |
| 4,034,801 | William F. Berstein | |
| 4,718,021 | Stanley W. Timblin | Jan. 5, 1988 |
| 4,393,662 | George Dirth | July 19, 1983 |
| 3,567,115 | Lorne W. Nelson | Dec. 7, 1970 |
| 2,701,128 | L. H. Gilleck et al. | Feb. 1, 1955 |
| 2,292,160 | E. W. Roessler | Aug. 4, 1941 |

Of the patents included on the search, many of the patents had exterior sensors to monitor outdoor temperature, but none of them seemed to rely upon such sensors and building characteristics for controlling perimeter heating. Additionally, the control systems described in the patents uncovered on the search, do not teach toward utilization thereof as a reference in combination with U.S. Pat. No. 4,582,982 to be applied against a hot water PACE system.

Of the patents uncovered, Grimado et al., U.S. Pat. No. 4,475,685 (hereinafter Grimado '865) monitors outside temperatures and controls the heating system by a device which determines a time a predetermined temperature. Likewise Westphal et al., U.S. Pat. No. 4,136,391, (hereinafter Westphal '391), correlates data from an outside temperature sensor with a look-up table which provides for cycling loads on and off, according to a predetermined cycle rate.

Further, the disclosure of the Pat. of the inventor hereof, namely, Piegari, U.S. Pat. No. 4,582,982; the patent of S. W. Timblin, U.S. Pat. No. 4,718,021; and, the patent of G. Dirth, U.S. Pat. No. 4,393,662, all supra are occasioned as being cited as references of interest in the parent case.

SUMMARY

In general terms, the invention disclosed hereby includes a valve controller for a hot water heating system for a building having a determined heat loss characteristic and a heating system therefor with a water heater, a hot water circulating device, and mechanism for varying the amount of heat thereto. The water circulating device includes a water control valve, which is responsive to environmental condition sensors for sensing weather parameters.

In one system configuration, a controller is used to control the flow of heated circulating water in response to the sensed weather parameters. The valve controller has a flow timer for variably establishing flow periodicity between a minimum flow time and a maximum flow time. The valve controller also has a base cycle timer for variably establishing base cycle periodicity between a minimum base time and a maximum base time. In this form of the system, a selector is provided, responsive to the building heat requirement, for selecting flow time and base cycle time. A valve operator operates in response to the valve controller and opens and closes the water control valve.

In a second configuration, a controller is used to control the temperature of circulating water. A proportional valve regulates the loop temperature in response to the sensed weather parameters.

OBJECT AND FEATURES OF THE INVENTION

It is an object of the present invention to provide an improved hot water heating system controlled by outside temperature.

It is a further object of the present invention to provide a hot water heating system for heating the perimeter of a building, which system is controlled by outside temperature.

It is a yet further object of the present invention to provide a hot water perimeter heating system with an improved zone heating controller, which zone heating is determined by sensed weather parameters. It is a still yet further object of the present invention to provide a hot water perimeter heating system with each zone receiving added heat in accordance with the building characteristics and the weather parameters affecting the zone.

Other objects and features of the invention will become apparent upon review of the drawings and the detailed description which follow.

BRIEF DESCRIPTION OF THE DRAWINGS

In the following drawings, the same parts in the various views are afforded the same reference designators.

DESCRIPTION OF THE PREFERRED EMBODIMENT

By way of introduction, the preferred form of the invention is a valve controller for a hot water heating system for a building. To apply the invention, the heat loss characteristic of the building is first determined. Consistent therewith a heating system therefor with a water heater, a hot water circulating device, and mechanism for varying the amount of heat thereto is provided. The water circulating device has a water control valve, which is responsive to environmental condition sensors for sensing weather parameters. In the best mode of practicing the invention, a controller is used to control the flow of heated circulating water in response to the sensed weather parameters. The valve controller has a flow timer for variably establishing flow periodicity between a minimum flow time and a maximum flow time. The valve controller also has a base cycle timer for variably establishing base cycle periodicity between a minimum base time and a maximum base time. In this form of the system, a selector is provided, responsive to the building heat requirement, for selecting flow time and base cycle time. A valve operator operates in response to the valve controller and opens and closes the water control valve. In another mode, a controller is used to control the temperature of circulating water. A proportional valve regulates the loop temperature in response to the sensed weather parameters.

In the present invention, two types of control loops are employed, namely, a closed loop control for setting the general heat level of the building and one or more open loops for adjusting the primary control to take into account other system and environmental variables.

The primary control loop is based upon the validity of the premise that a given building has an established heat loss characteristic by which heat is lost largely through the outer boundary layer or walls thereof at a rate related to the outside temperature. A further corollary of this premise is that, without conditioning, the air in the central portion of a building will remain at relatively stable heat levels and people in this zone experience comfortable ambient conditions over a reasonably broad temperature range. Conversely, at the site of heat loss, namely, the perimeter, a region of discomfort exists which needs rectifying by a controlled heating system to add back heat loss. From experimental work with perimeter heating conducted prior to the filing of the present inventor's above-mentioned patent U.S. Pat. No. 4,582,982, it was found that active outside temperature sensors for controlling the heat output of electric perimeter heaters are effective in providing make up heat at the adversely affected zone of the building. However, because of the need for a novel controller, the theoretical basis of the PACE System was not obviously extendable to a hot water system. The system described herein overcomes this problem, while retaining the extraordinary ability to "tune" or calibrate each building in response to the heat loss characteristic thereof. Additionally, the total heat added is a function of outside temperature correlated with the heat output of the heaters. This is in contrast to providing heat in response to changes in the interior temperature of the structure.

The secondary control loops are open loops for modifying the primary control loop. Such controls as monitoring solar radiation and wind effects and providing night setback an morning startup are among the most commonly employed secondary controls.

In the case of solar radiation, a sensor is used that responds to direct solar heat levels. Also responds to additional radiation derived from reflected heat. In this mode, the secondary control loop automatically adjusts the heat output of the Hot Water Heater to compensate for the solar exposure. This compensation is proportional to the solar heat gain on the building exposure controlled by the solar sensor.

Similarly, the wind effect sensor compensates for boundary layer disturbances which tend to accelerate heat losses through the skin of the building. Through this sensor, the heat output is increased and the compensation improves the comfort of the building by reducing the presence of air at temperatures considerably different from that of the building core.

In the preferred embodiment, separate sensors are utilized for monitoring outside temperature, solar radiation, and heat losses because of wind effects. While this is presently preferred, sets of single, active multifunction sensors, which are actually each an analog of the building, are feasible. However, with the multifunction sensors, each control signal for correction of a given parameter is one derived by processing of the information from the sensors.

In the morning startup compensation, a temperature ramp is established so that the increase in interior temperature will be at a constant rate and will preclude the building air temperature reaching desired levels while the building mass—the frame, walls, ceilings, floors and furniture—are still cold. Bringing the building mass up to temperature by a morning startup control feature greatly enhances the comfort of the heating system. To accomplish this, the initial time for onset of morning startup is determined by an interior temperature sensor which acts merely to "set the clock". The rate of increase of temperature is then controlled by the startup circuitry so that the building temperature is returned to normal day operating temperature in time for the arrival of workers at the building. This feature operates in conjunction with the night setback provision by which the building temperature is permitted to decay to a new operating point with the decay rate determined entirely by the building heat loss characteristic. This heating system feature is coordinated with air damper operations, air conditioning fan operation and other elements of the air conditioning and ventilating system.

Figure 1:
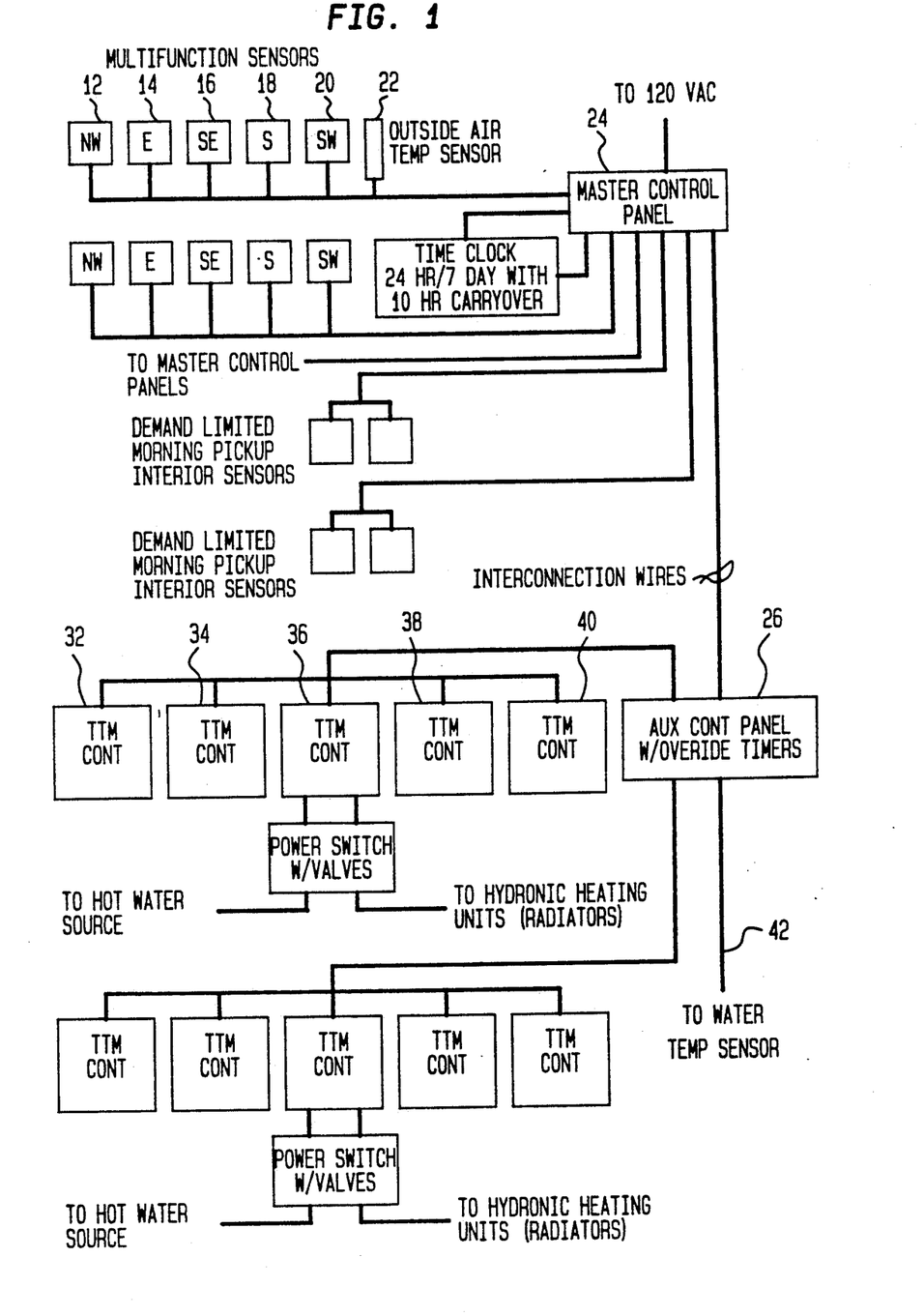
FIG. 1 is a block schematic diagram of the hot water central control system of the first embodiment of the present invention having multifunction sensors and a continuously variable pulse controller.

Referring now to FIG. 1, a block diagram illustrating a preferred embodiment of the present invention is shown. A northwest zone sensor 12 is located in a first building portion; and, in the same building portion, an east zone sensor 14, a southeast zone multifunction sensor 16, a southeast zone sensor 18 and a southwest zone sensor 20. Additionally an outside temperature sensor 22 is provided for baseline reference (rather than control function). Although multifunction sensors are described in the best mode of practicing the invention, separate sensors for each environmental condition sensed are equally applicable. These sensors 12 through 22 transmit control signals to the master control panel 24 where the signals are processed for control purposes. The sensors of this system are multiple, independent sensors which, in turn, are structured to provide separate control signals for each control parameter, namely, outside temperature (primary), solar radiation (secondary), and wind (secondary). In processing these signals, the master control panel 24 is structured to provide both primary and secondary control signals whereby the primary control signals will uniformly control all heating zones and secondary control signals will differentially control the heating zones.

The primary control signal from master control panel 24 is used to provide through the auxiliary control panel 26 a proportional voltage output for heating control. In the specification which follows, the term "thermal transfer medium" or the mnemonic "TTM" is used in lieu of "hot water", "polyethylene glycol" or whatever medium is used to carry heat. It is understood that the heating system and the controls therefor, where described as applicable to a "hot water" medium, are equally applicable to other "thermal transfer media". This signal is distributed to all the thermal transfer medium (TTM) controllers which control the heat output in each of the respective zones, to wit: TTM NW controller 32, TTM E controller 34, TTM SE controller 36, TTM S controller 38 and TTM SW controller 40. At the master control panel 24, the derived primary control signal (which is previously described as an analog signal) is further modified at the master control panel 24 by a calibration circuit (not shown) to adjust on a semi-empirical basis for the building heat loss characteristic.

In the particular heating control system disclosed, the temperature variation in building hot water supply is compensated through temperature sensor 42. Temperature variations in the hot water supplied is detected at the monitoring circuitry (shown as four-wire control circuit) and is provided to the master control panel 24. At panel 24, the baseline of the primary control signal is then adjusted accordingly so that the total heat output resulting from the shifts in the derived primary control signal remains constant regardless of temperature changes in building hot water supplied.

The signals from the multifunction sensors 12, 14, 16, 18 and 20 are further processed to obtain derived secondary control signals, namely, wind and solar compensation. These signals are used at each zone control to adjust heat output therewithin. As contrasted to the previously discussed control, the secondary control is akin to fine tuning the building. Thus, in the zone served by the TTM SE controller 36, the solar radiation during a November sunny day is monitored by multifunction sensor SE 16 and a secondary control signal is derived at the master control panel 24. As the total heat output required by this zone under such conditions is obviously less, the reduction of output is demanded by the control signal. Similarly, the monitoring of wind intensity and compensating for building heat loss because of wind factors is also gained. When both a solar radiation control signal and a wind intensity control signal are derived for a single zone, the signals are preferably summed to comprise a single, composite secondary control signal for each zone.

Figure 2:
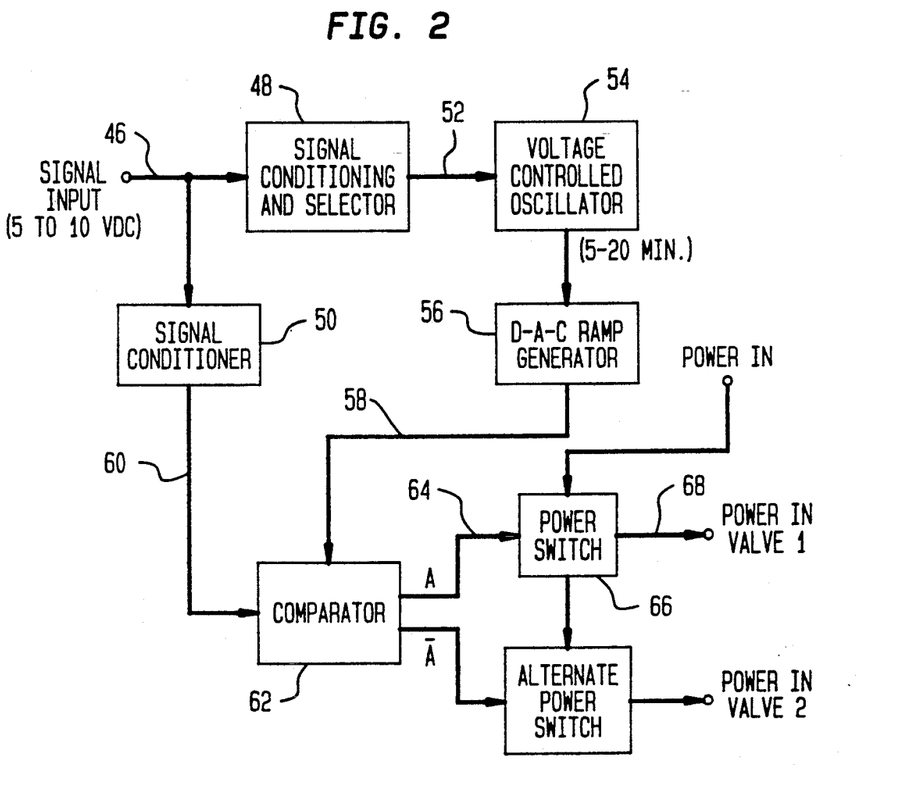
FIG. 2 is a block schematic diagram of the valve controller for the system of FIG. 1 having a fixed minimum ON time and a continuously variable cycle time.

Referring now to FIG. 2, a block diagram of one embodiment of the TTM controller 32 is shown. Although the controller described is for the NW zone, it is also typical of the controllers 34, 36, 38 and 40. The controller 32 is structured to receive an input signal 46 shown as 5 to 10 VDC. The input signal 46 is received by a signal conditioner and selector 48 and a signal conditioner 50 for suppressing the startup of valve operation, when demand is for less than 5% of requirement, and for providing continuous valve operation, when demand is for more than 95% of requirement. Both the upper and lower limits of the control range are adjustable to narrow the operating band. When the operating band is narrowed to any extent, the short cycling of the controlled operation and any ambiguity of action is eliminated. For a valve controller, this precludes inducing valve chattering as the control level is approached. Besides varying the operating band, the length of the controlled cycle is continuously variable. In the best mode of practicing this invention, the cycle time is continuously variable from 5 to 20 minutes, which time period provides for sufficient circulation transit time for the heated water or thermal transfer medium. To accomplish these actions, the signal 52 resulting from the signal conditioner and selector 48 is applied first to a voltage controlled oscillator 54 and then to a digital-to-analog ramp generator 56. The output 58 of the ramp generator 56 is compared to the output 60 of the signal conditioner 50 by a comparator 62. If additional heat is required at the perimeter of the building and the requirement is within operational range discussed hereinabove, a demand signal 64 applies power through a power switch 66 to a VALVE 1 operator 68. Because of the characteristics of the building and the threshold requirement of the TTM controller 32, the above arrangement establishes a fixed period which becomes the minimum period of operation. simultaneously, the voltage controlled oscillator provides for the selection of a cycle time that is continuously variable, specifically, in the example shown, from 5 to 20 minutes.

Figure 3:
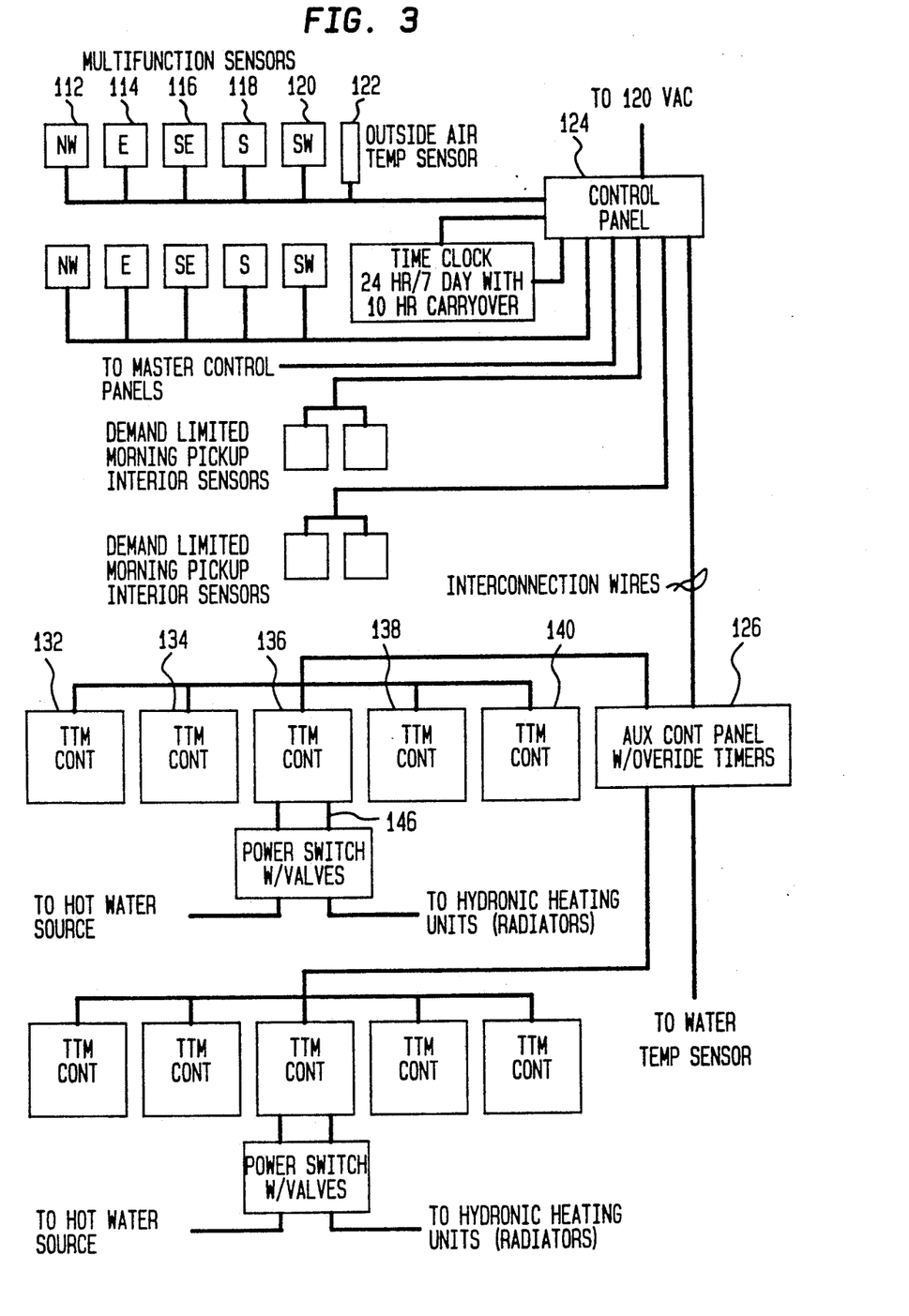
FIG. 3 is a block schematic diagram of the hot water central control system of the second embodiment of the present invention having multifunction sensors and a discrete cycle pulse controller.

In the description which follows, a second embodiment of the TTM controller is disclosed. Many of the components have similar functions and nomenclature in both of the embodiments. In order to facilitate understanding of the controllers, similar items in the second embodiment are afforded reference designators "100" digits higher than those in the first embodiment. For example, the signal conditioner 0 of the first embodiment is analogous to the signal conditioner 150 in the second embodiment. Like the previous embodiment, the second embodiment comprises a northwest zone sensor 112 located in a first building portion, and, in the same building portion, an east zone sensor 114, a southeast zone sensor 116, a southeast zone sensor 118 and a southwest zone sensor 120. Additionally an outside temperature sensor 122 is provided for control function. These sensors 112 through 122 transmit control signals to the master control panel 124 where the signals are processed for control purposes. The sensors of this system are multiple, independent sensors which, in turn, are structured to provide separate control signals for each control parameter, namely, outside temperature (primary), solar radiation (secondary), and wind (secondary). In processing these signals, the master control panel 124 is structured to provide both primary and secondary control signals whereby the primary control signals uniformly control all heating zones and secondary control signals further differentially control the heating zones. Thus, empirically calculated, perimeter heating losses resulting from outside temperature and the building characteristics are replaced by added thermal energy. Also each zone is "fine tuned" by the secondary control parameters to eliminate "sunny side" and "windy side" disparities.

Figure 4:
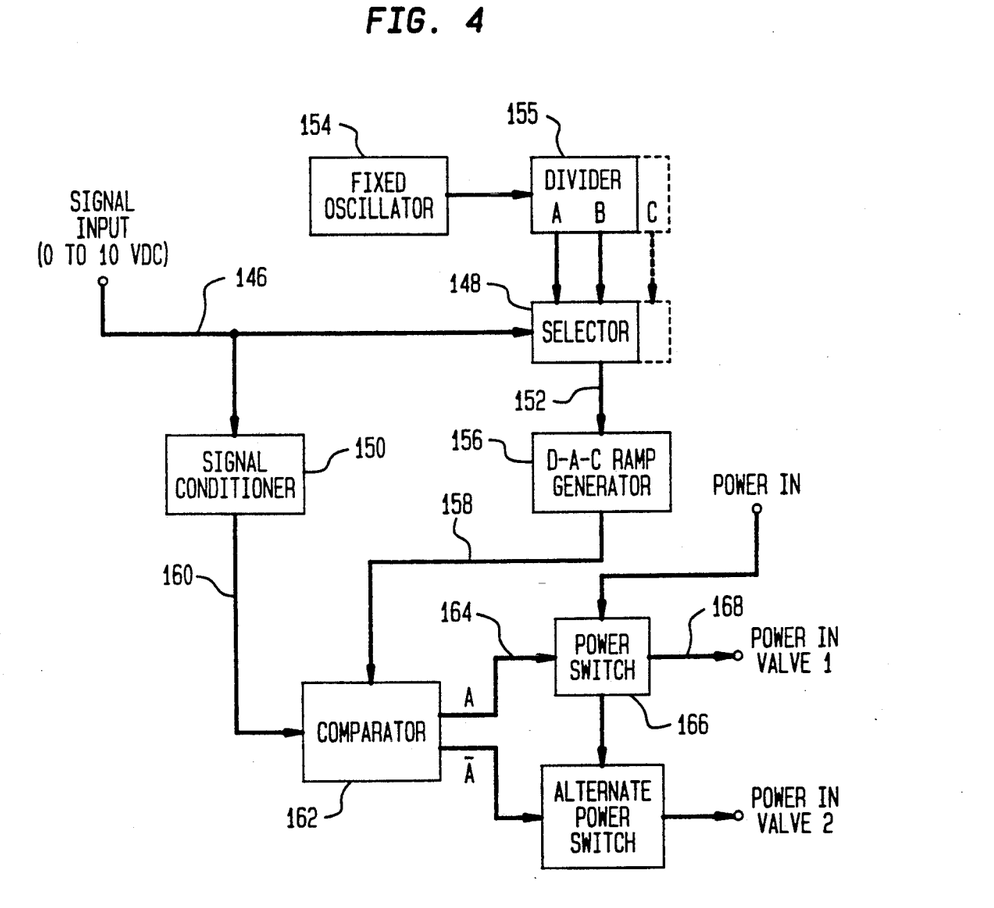
FIG. 4 is a block schematic diagram of the valve controller for the system of FIG. 3 having a selected minimum ON time and a selected discrete cycle time; and, FIG. 5 is a block schematic diagram of the hot water central control system of the third embodiment of the present invention having multiple sensors and an individual zone controller using a heating unit water temperature input.

Referring now to FIGS. 3 and 4, a block diagram of the second embodiment of the TTM controller 132 is shown. Although the controller described is for the NW zone, it is also typical of the controllers 134, 136, 138 and 140. The controller 132 is structured to receive an input signal 146 shown as 0 to 10 volts DC. The controller 132 includes a fixed oscillator 154 and a divider 155 for enabling the selector 148 to set the cycle time as is described in greater detail hereinbelow. The input signal 146 is also received by selector 148 and a signal conditioner 150 for suppressing the startup of valve operation, when demand is for less than 5% of requirement, and for providing continuous valve operation, when demand is for more than 95% of requirement. Both the upper and lower limits of the control range are adjustable to narrow the operating band. When the operating band is narrowed to any extent, the short cycling of the controlled operation and any ambiguity of action is eliminated. For a valve controller, this precludes inducing valve chattering as the control level is approached. Besides varying the operating band, the length of the controlled cycle time is varied or stepped from one discrete cycle length to a selected member of others. In the second embodiment, the cycle is divided so that a period of 5, 10, or 20 minutes is selectable as the demand requires, which ti=period provides for sufficient circulation transit time for the heated water or thermal transfer medium. To accomplish these actions, the signal 152 resulting from the selector 148 is applied to a digital-to-analog ramp generator 156. The output 158 of the ramp generator 156 is compared to the output 160 of the signal conditioner 150 by a comparator 162. If additional heat is required at the perimeter of the building and the requirement is within operational rang discussed hereinabove, a demand signal 164 applies power through a power switch 166 to a VALVE 1 operator 168. Taking together the characteristics of the building and the threshold requirement of the TTM controller 132, the above arrangement determines a fixed period which, in turn, becomes the minimum period of operation. Simultaneously, the voltage controlled oscillator provides for the selection of a discrete cycle time that is variable in a stepwise manner, specifically, in the example shown, from 5 to 20 minutes in 5-minute steps.

In the description which follows, another embodiment of the hot water heating control system of this invention is disclosed. Many of the components have similar functions and nomenclature in both of the embodiments. In order to facilitate understanding of the controllers, similar items in this embodiment are afforded reference designators "200" digits higher than those in the first embodiment.

Figure 5:
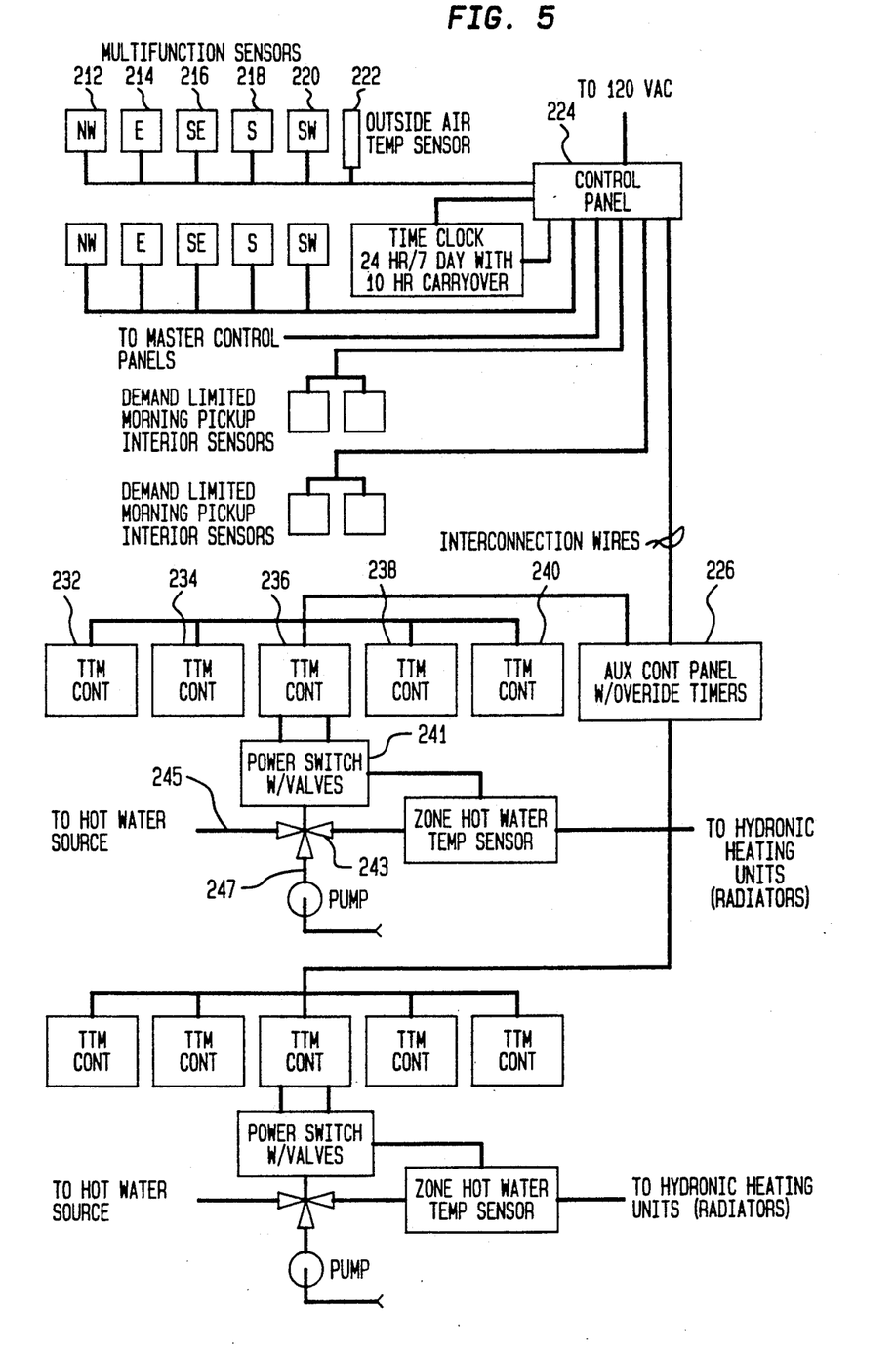

FIG. 5 is a block diagram illustrating a third embodiment of the present invention. These embodiments are contrasted with the first two embodiments in that a zone temperature control device is used rather than a pulse-type controller. In this embodiment, water temperature supplied is monitored at the perimeter heater device rather than at the boiler outlet. Like the previous embodiments, the third embodiment comprises a northwest zone sensor 212 located in a first building portion, and, in the same building portion, an east zone sensor 214, a southeast zone sensor 216, a southeast zone sensor 218 and a southwest zone sensor 220. Additionally an outside temperature sensor 222 is provided for control function. These sensors 212 through 222 transmit control signals to the master control panel 224 where the signals are processed for control purposes. The sensors of this system are multiple, independent sensors which, in turn, are structured to provide separate control signals for each control parameter, namely, outside temperature (primary), solar radiation (secondary), and wind (secondary). In processing these signals, the master control panel 224 is structured to provide both primary and secondary control signals whereby the primary control signals uniformly control all heating zones and secondary control signals further differentially control the heating zones. Thus, empirically calculated, perimeter heating losses resulting from outside temperature and the building characteristics are replaced by added thermal energy. Also each zone is "fine tuned" by the secondary control parameters to eliminate "sunny side" and "windy side" disparities.

The secondary control signal from master control panel 224 is used to provide through the control panel 226 a proportional voltage output for heating control. This signal is distributed to all the loop-temperature or zone controllers 241 which provide loop-temperature control by proportionally operating a mixing valve 243 between heated water 245 and loop recirculated water 247. The building perimeter thermal condition or, in other words, the heat output in each of the respective zones, to wit: NW loop controller 232, E loop controller 234, SE loop controller 236, S loop controller 238 and SW loop controller 240. At the master control panel 224, the derived primary control signal, which is previously described, is further modified at the master control panel 224.

In operation, the flow timer, as described hereinabove, is set up for a variably establishing flow periodicity between a minimum flow time and a maximum flow time. Similarly, a base cycle timer is provided to variably establish the base cycle periodicity between a minimum base time and a maximum base time. Then, in response to building heat requirements for selecting flow time and base cycle time. In a typical arrangement, the minimum flow time is 1 minute and the maximum flow time is 5 minutes and the minimum base time is 5 minutes and the maximum base time is 20 minutes. For further control definition purposes, with the maximum flow time and minimum base time being equal, the operation is frequently expressed as a percentage of full cycle time. Then, the control valve operation is in a continuously variable manner from a minimum percentage of full cycle time, derived by:

$$\frac{\text{minimum flow time}}{\text{maximum base time}} \times 100\%$$

to 100% of full cycle time. In application of this formula, the water control valve previously described in detail is continuously and variably controllable to an open position from 5% to 100% of full cycle time. Under the same flow parameters, when the minimum base time is 5 minutes and the maximum base time is 10 minutes, the water control valve is continuously and variably controllable to the open position from 10% to 100% of full cycle time. In another arrangement, the minimum flow time is 1.5 minutes and the maximum flow time is 5 minutes and the minimum base time is 5 minutes and the maximum base time is 20 minutes. Then, the water control valve is continuously and variably controllable to the open position from 7.5% to 100% of full cycle time. Under the same flow parameters, when the minimum base time is 5 minutes and the maximum base time is 10 minutes, the water control valve is continuously and variably controllable to the open position from 15% to 100% of full cycle time.

Although the best mode of the invention has been described herein in some detail, it has not been possible to include each and every variation. Those skilled in the art of hot water heating control systems will be able to make slight variations in the arrangement suggested hereby without departing from the spirit of the invention and still be within the scope of the claims appended hereto.

What is claimed is:

1. A valve controller for a hot water heating system having water heating means, water circulating means, and heater means by operating a water control valve between an open and a closed position, said valve controller comprising:
   flow timer means for variably establishing flow periodicity between a minimum flow time and a maximum flow time;
   base cycle timer means for variably establishing base cycle periodicity between a minimum base time and a maximum base time; and,
   selector means responsive to heat requirement for selecting flow time and base cycle time.

2. A valve controller for a hot water heating system as described in claim 1, wherein maximum flow time and minimum base time are equal and, when expressed in percentage of full cycle time, the control valve is operable in a continuously variable manner from a minimum percentage of full cycle time, derived by:

$$\frac{\text{minimum flow time}}{\text{maximum base time}} \times 100\%$$

to 100% of full cycle time.

3. A valve controller for a hot water heating system described in claim 2 wherein the minimum flow time is 1 minute and the maximum flow time is 5 minutes.

4. A valve controller for a hot water heating system as described in claim 3 wherein the minimum base time is 5 minutes and the maximum base time is 20 minutes and whereby said water control valve is continuously and variable controllable to said open position from 5% to 100% of full cycle time.

5. A valve controller for a hot water heating system as described in claim 3 wherein the minimum base time is 5 minutes and the maximum base time is 10 minutes and whereby said water control valve is continuously and variably controllable to said open position from 10% to 100% of full cycle time.

6. A valve controller for a hot water heating system as described in claim 2 wherein the minimum flow time is 1.5 minutes and the maximum flow time is 5 minutes.

7. A valve controller for a hot water heating system as described in claim 6 wherein the minimum base time is 5 minutes and the maximum base time is 20 minutes and whereby said water control valve is continuously and variably controllable to said open position from 7.5% to 100% of full cycle time.

8. A valve controller for a hot water heating system as described in claim 6 wherein the minimum base time is 5 minutes and the maximum base time is 10 minutes and whereby said water control valve is continuously and variably controllable to said open position from 15% to 100% of full cycle time.

9. A valve controller for a hot water heating system in a building having a determined heat loss characteristic and a heating system therefor including water heater means, water circulating means, and heater means for supplying variable amounts of heat thereto, said water circulating means including a water control valve, said valve controller comprising in combination:
   first environmental condition sensing means for sensing the outdoor temperature, said means providing a first derived control signal in response thereto;
   controller means for controlling the flow of heated circulating water in response to the monitored first environmental condition, said first valve controller means, in turn, comprising:
      flow timer means for variably establishing flow periodicity between a minimum flow time and a maximum flow time;
      base cycle timer means for variably establishing base cycle periodicity between a minimum base time and a maximum base time; and,
      selector means responsive to heat requirement for selecting flow time and base cycle time; and,
   a valve operator means for operating, in response to said valve controller, said water control valve between an open position and a closed position.

10. A valve controller for a hot water heating system as described in claim 9, wherein said system further includes at least one second environmental condition sensing means for sensing a parameter selected from wind effect, solar radiation effect, other boundary layer disturbances, and the combined effect of two or more thereof; and, electronic control means setting said selector means from one balanced level to another in response to changes in the outside environmental conditions as sensed by first and said second environmental condition sensing means.

11. A valve controller for a hot water heating system as described in claim 10, wherein said controller means includes:

said water temperature sensing means for sensing the water temperature at said perimeter heater means; and, proportioning valve controller to maintain amount of heat at perimeter heater means substantially constant for substantially constant outdoor temperature and correspondingly changing the amount of heat in cooperative functional relationship with said zone compensation means.

12. A valve controller for a hot water heating system as described in claim 11 wherein said first derived control signal is proportionate to the calculated building heat loss characteristic.

13. A valve controller for a hot water heating system as described in claim 10 wherein said second environmental condition sensing means provides and is responsive to a second derived control signal.

14. A valve controller for a hot water heating system as described in claim 13 wherein said second derived control signal is in part a signal proportionate to the calculated building heat loss characteristic.

15. A valve controller for a hot water heating system as described in claim 9, wherein the minimum flow time is 1.5 minutes and the maximum flow time is 5 minutes.

16. A valve controller for a hot water heating system as described in claim 9 wherein the minimum base time is 5 minutes and the maximum base time is 20 minutes and whereby said water control valve is continuously and variably controllable to said open position form 7.5% to 100% of full cycle time.

17. A valve controller for a hot water heating system as described in claim 16, wherein the minimum base time is 5 minutes and the maximum base time is 10 minutes and whereby said water control valve is continuously and variably controllable to said open position from 15% to 100% of full cycle time.

* * * * *